United States Patent
Abe et al.

(10) Patent No.: US 8,123,839 B2
(45) Date of Patent: Feb. 28, 2012

(54) POROUS POLYTETRAFLUOROETHYLENE MEMBRANE AND METHOD OF PRODUCING THE SAME, AND FILTER MEDIUM

(75) Inventors: Yuuichi Abe, Osaka (JP); Masaaki Mori, Osaka (JP); Kousei Takiishi, Osaka (JP)

(73) Assignee: Nitto Denko Corporation, Osaka (JP)

(*) Notice: Subject to any disclaimer, the term of this patent is extended or adjusted under 35 U.S.C. 154(b) by 386 days.

(21) Appl. No.: 12/424,907

(22) Filed: Apr. 16, 2009

(65) Prior Publication Data

US 2009/0277141 A1 Nov. 12, 2009

(30) Foreign Application Priority Data

May 12, 2008 (JP) .................................. 2008-124962
Aug. 6, 2008 (JP) .................................. 2008-203441

(51) Int. Cl.
*B01D 53/22* (2006.01)

(52) U.S. Cl. ............ 96/4; 95/43; 95/45; 55/522; 55/527

(58) Field of Classification Search .............. 95/43, 45; 96/4; 55/522, 527
See application file for complete search history.

(56) References Cited

U.S. PATENT DOCUMENTS

| | | | | |
|---|---|---|---|---|
| 4,368,766 A | * | 1/1983 | Nomi | 383/80 |
| 4,671,754 A | * | 6/1987 | Okita et al. | 425/66 |
| 4,902,423 A | | 2/1990 | Bacino | |
| 5,110,527 A | * | 5/1992 | Harada et al. | 264/127 |
| 5,830,603 A | * | 11/1998 | Oka et al. | 429/249 |
| 6,030,428 A | | 2/2000 | Ishino et al. | |

FOREIGN PATENT DOCUMENTS

| | | |
|---|---|---|
| EP | 0 641 594 A1 | 3/1995 |
| EP | 2 000 499 A2 | 12/2008 |
| JP | 8-032791 B2 | 3/1996 |
| JP | 2792354 B2 | 6/1998 |
| JP | 2007-260547 A | 10/2007 |
| WO | WO 90/08801 A1 | 8/1990 |

* cited by examiner

*Primary Examiner* — Jason M Greene
*Assistant Examiner* — Anthony Shumate
(74) *Attorney, Agent, or Firm* — Hamre, Schumann, Mueller & Larson, P.C.

(57) ABSTRACT

First, a mixture of a polytetrafluoroethylene fine powder and a liquid lubricant into a sheet-form body extending in a first direction. Next, the liquid lubricant is removed from the sheet-form body. Then, the sheet-form body is stretched by a factor of 40 to 250 in the longitudinal direction at a temperature equal to or higher than a melting point of polytetrafluoroethylene, and the stretched sheet-form body is further stretched by a factor of 3 to 40 in the width direction. Thus, a highly air-permeable porous polytetrafluoroethylene membrane is obtained.

8 Claims, 5 Drawing Sheets

POROUS POLYTETRAFLUOROETHYLENE MEMBRANE AND METHOD OF PRODUCING THE SAME, AND FILTER MEDIUM

BACKGROUND OF THE INVENTION

1. Field of the Invention

The present invention relates to a porous polytetrafluoroethylene (hereinafter referred to as "PTFE") membrane and a method of producing the PTFE membrane, and a filter medium using the porous PTFE membrane.

2. Related Background Art

Conventionally, as filter media for air filters, filters for vacuum cleaners, bag filters for incinerators, membrane filters, and the like, filter media including porous PTFE membranes are used. Such porous PTFE membranes are required to have not only air permeability but also high efficiency in collecting particles contained in a gas. For example, a porous PTFE membrane produced so as to have an average pore diameter of 1 μm or less has been proposed (see, for example, Japanese Patent No. 2792354).

In recent years, however, high air permeability, rather than particle collection efficiency, has been required preferentially for some purposes. For example, in the case where a filter medium for dust protection is provided on a container including gas, the external heat or cool air causes the gas in the container to expand or contract, which generates a pressure difference between the inside and the outside of the container. If the filter medium has a high air permeability, it has a high capability of eliminating the pressure difference between the inside and the outside of the container, and reduces the load on the container accordingly. For this reason, in using a specific container or an apparatus, high air permeability is required for a porous PTFE membrane in order to reduce the load imposed on the container due to a change in the external environment.

JP 08 (1996)-32791 B discloses the following production method for obtaining a porous PTFE membrane having a high air permeability. First, a mixture of a PTFE fine powder and a liquid lubricant is formed into a sheet-form body by an extrusion method, and then this sheet-form body is stretched preliminarily in the width direction. Next, the liquid lubricant is removed from the sheet-form body by heating, and then the sheet-form body is stretched biaxially at a temperature equal to or lower than the melting point (327° C.) of PTFE. Thereafter, heat setting is carried out by heating the stretched sheet-form body to a temperature equal to or higher than the melting point of PTFE.

The production method disclosed in JP 08 (1996)-32791 B, however, requires a large number of steps because of the preliminary stretching and heat setting.

SUMMARY OF THE INVENTION

The present invention has been made in view of the above circumstances, and it is an object of the present invention to provide a production method for obtaining a highly air-permeable porous PTFE membrane with a smaller number of steps and a porous PTFE membrane produced by this production method, and a filter medium using this porous PTFE membrane.

The inventors of the present invention have studied the stretching temperature, stretching time, etc. in order to obtain a porous PTFE membrane having a high air permeability. As a result, they have found out that a highly air-permeable porous PTFE membrane having a structure with long fibrils and large pores like a web can be obtained by stretching first a sheet-form body by a factor of 40 or more in one direction at a temperature equal to or higher than the melting point of PTFE and then stretching further the stretched sheet-form body by a factor or 3 or more in a direction orthogonal to the one direction.

The present invention provides a method of producing a porous PTFE membrane including: forming a mixture of a PTFE fine powder and a liquid lubricant into a sheet-form body extending in a first direction; removing the liquid lubricant from the sheet-form body; stretching the sheet-form body by a factor of 40 to 250 in the first direction at a temperature equal to or higher than a melting point of PTFE; and further stretching the stretched sheet-form body by a factor of 3 to 40 in a width direction orthogonal to the first direction.

The present invention also provides a porous PTFE membrane obtained by the above method of producing a porous PTFE membrane. This porous PTFE membrane has an air permeability corresponding to a Frazier number of 30 to 200 $cm^3/cm^2/s$.

A Frazier number is defined herein as a value measured in accordance with the Frazier Tester as set forth in JIS L 1096.

The present invention further provides a filter medium including: the above porous PTFE membrane; and an air-permeable supporting member attached to this porous PTFE membrane.

According to the present invention, it is possible to obtain a highly air-permeable porous PTFE membrane with a smaller number of steps.

DETAILED DESCRIPTION OF THE INVENTION

Figure 1:
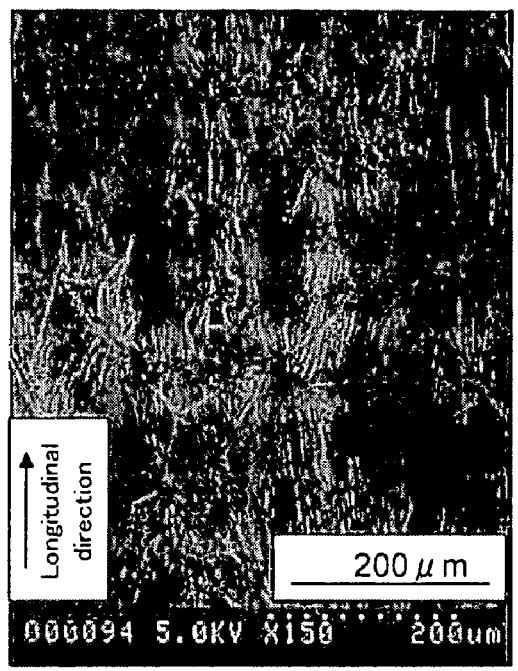
FIG. 1 is a photomicrograph of a porous PTFE membrane of Sample 1 taken at a magnification of 150.
Figure 2:
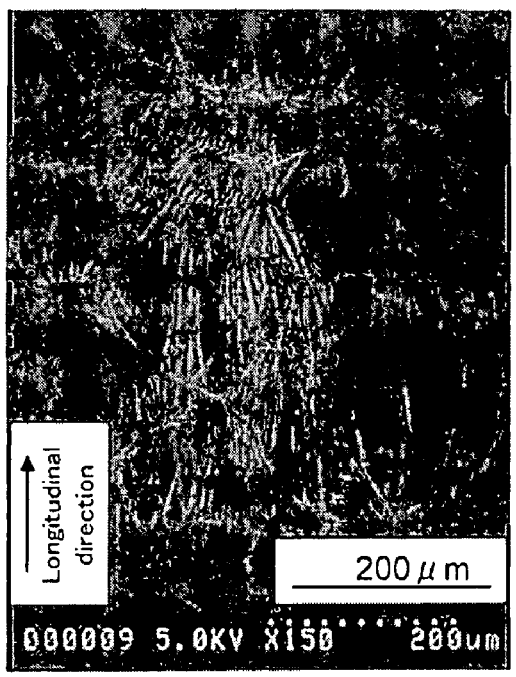
FIG. 2 is a photomicrograph of a porous PTFE membrane of Sample 2 taken at a magnification of 150.
Figure 3:
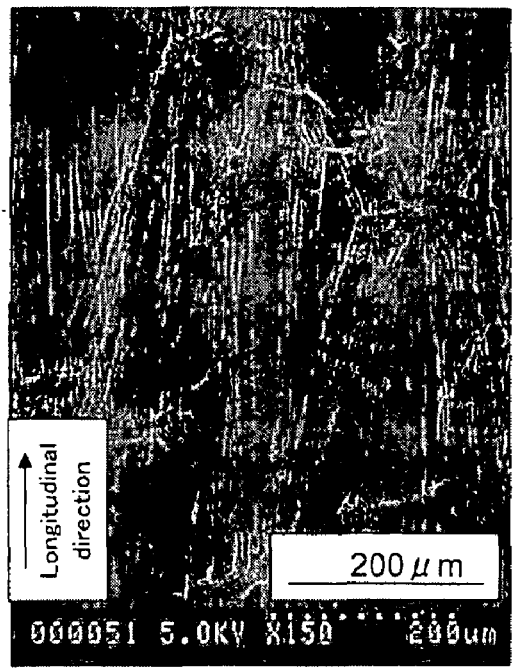
FIG. 3 is a photomicrograph of a porous PTFE membrane of Sample 4 taken at a magnification of 150.
Figure 4:
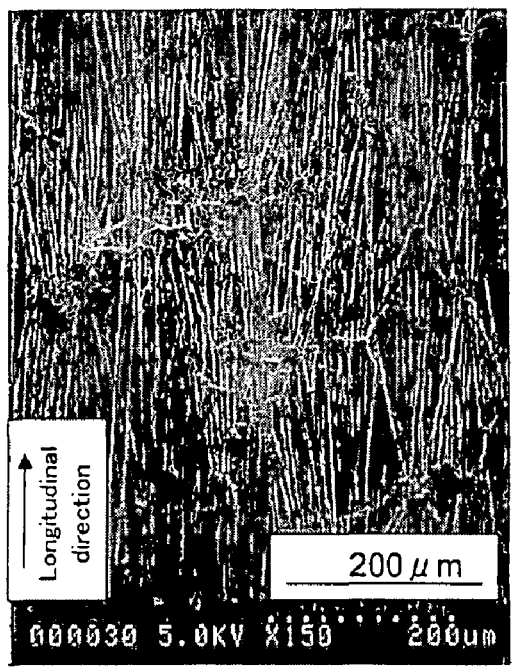
FIG. 4 is a photomicrograph of a porous PTFE membrane of Sample 5 taken at a magnification of 150.
Figure 5:
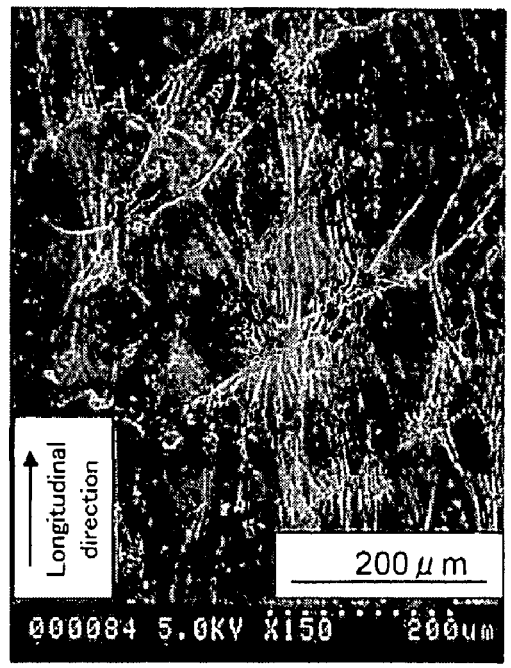
FIG. 5 is a photomicrograph of a porous PTFE membrane of Sample 7 taken at a magnification of 150.
Figure 6:
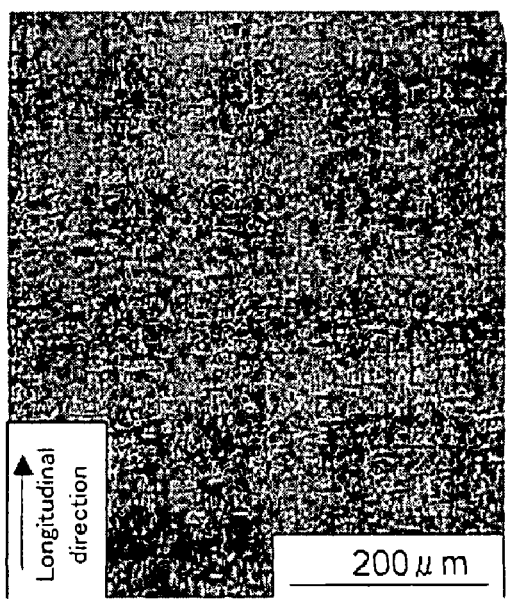
FIG. 6 is a photomicrograph of a porous PTFE membrane of Comparative Example 1 taken at a magnification of 150.
Figure 7:
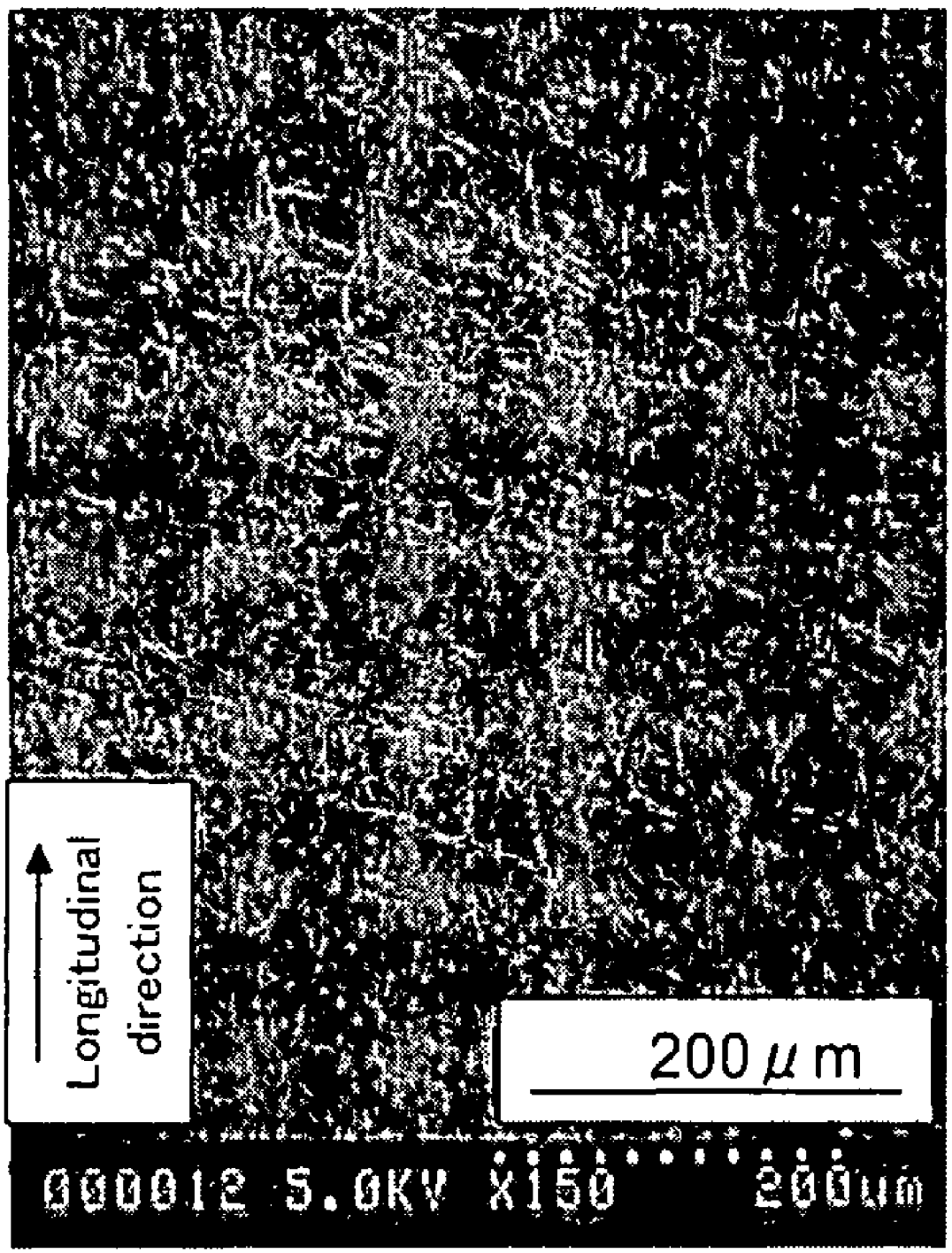
FIG. 7 is a photomicrograph of a porous PTFE membrane of Comparative Example 2 taken at a magnification of 150.

Hereafter, a method of producing a porous PTFE membrane of the present invention will be described.

First, a mixture of a PTFE fine powder and a liquid lubricant is, in an unsintered state, formed into a sheet-form body extending in a first direction by at least one of an extrusion method and a rolling method.

There is no particular limitation on the PTFE fine powder, and various types of commercially available PTFE fine powder can be used. Examples of the PTFE fine powder include Polyflon F-104 (produced by Daikin Industries, Ltd.), Fluon CD-123 (produced by Asahi Glass Co., Ltd.), and Teflon 6J (produced by Du Pont-Mitsui Fluorochemicals Co., Ltd.).

There is no particular limitation on the liquid lubricant as long as it is capable of wetting the surface of the PTFE fine powder and of being removed by a technique such as evaporation and extraction. Examples of the liquid lubricant include hydrocarbons such as liquid paraffin, naphtha, toluene, and xylene. Examples thereof also include alcohols, ketones, esters, and fluorine-based solvents. Mixtures of two or more of these liquid lubricants also may be used. The amount of the liquid lubricant to be added depends on the sheet forming method. It is usually about 5 to 50 parts by weight per 100 parts by weight of the PTFE fine powder.

According to one example of the method for forming a mixture of a PTFE fine powder and a liquid lubricant into a sheet-form body, a mixture prepared by adding a liquid lubricant to a PTFE fine powder is compressed in a cylinder and extruded with a ram extruder, and thereby the mixture is formed into a sheet-form body. The sheet-form body thus obtained is rolled by a roll pair, and thus a sheet-form body having an appropriate thickness (usually 0.05 to 0.5 mm) is obtained.

Subsequently, the liquid lubricant is removed from the sheet-form body by heating or extraction so as to dry the sheet-form body.

Next, the sheet-form body, from which the liquid lubricant has been removed, is stretched in the above-mentioned first direction (hereinafter referred to as a "longitudinal direction") at a temperature equal to or higher than the melting point of PTFE. It is preferable that the sheet-form body is stretched by a factor of 40 to 250. This is because if the stretching factor is less than 40, the finally obtained membrane has shorter fibrils and a smaller average pore diameter, which makes it difficult to achieve high air permeability. On the other hand, if the stretching factor is excessively large, the sheet-form body is ruptured and thus a membrane cannot be obtained. The stretching factor is preferably 60 to 200, and more preferably 80 to 160.

After the longitudinal stretching, the sheet-form body thus stretched is stretched further in the width direction orthogonal to the longitudinal direction, usually at a temperature of 40 to 400° C. The stretching factor is preferably 3 to 40. More preferably, the stretching temperature is 100 to 300° C. in order to achieve high air permeability and prevent the rupture of the sheet-form body during the stretching.

From an industrial point of view, the smaller the number of steps involved is, the more preferable it is, but each of the above-mentioned stretching steps may be carried out in two or more stages.

Through the above-mentioned steps, the porous PTFE membrane having a structure in which fibrils extend predominantly in the longitudinal direction is obtained. This porous PTFE membrane has an air permeability corresponding to a Frazier number of 30 to 200 $cm^3/cm^2/s$, and each of the fibrils has a length of at least 100 µm.

If the porous PTFE membrane produced by the method disclosed in JP 08 (1996)-32791 B is subjected to an oil repellent treatment in order to prevent the adhesion of foreign substances to the membrane, the air permeability of the membrane is significantly reduced. In the case of the porous PTFE membrane obtained in the manner as described above, in contrast, the air permeability is not reduced so much even if the membrane is subjected to an oil repellent treatment. That is, the adhesion of foreign substances to the membrane can be prevented while maintaining the air permeability thereof.

The oil repellent treatment can be carried out by applying an oil repellent agent containing a substance with a low surface tension to the porous PTFE membrane and drying it. The oil repellent agent only needs to form a coating film with a lower surface tension than that of the porous PTFE membrane. For example, an oil repellent agent containing a polymer having a perfluoroalkyl group is used suitably. The oil repellent agent can be applied by dipping or by spraying. It should be noted that the air permeability of the porous PTFE membrane which has been subjected to the oil repellent treatment is preferably a Frazier number of 10 to 100 $cm^3/cm^2/s$.

In the case where the porous PTFE membrane obtained in the manner as described above is used in a filter medium, it is preferable to enhance the strength of the membrane by attaching an air-permeable supporting member thereto. There is no particular limitation on the material, structure and form of the air-permeable supporting member. As the air-permeable supporting member, materials having better air permeability than that of the porous PTFE membrane, such as nonwoven fabrics and meshes (net sheets), and other porous materials, can be used. Nonwoven fabrics preferably are used from the viewpoints of strength, particle collection efficiency, flexibility, and workability. Examples of the materials for the air-permeable supporting member include polyolefins (such as polyethylene (PE) and polypropylene (PP)), polyamides, polyesters (such as polyethylene terephthalate (PET)), aromatic polyamides, and composites of these materials.

There is no particular limitation on the method of attaching the air-permeable supporting member to the porous PTFE membrane, but preferably, they are adhered to each other by heat lamination, for example. The air-permeable supporting member is laminated on the porous PTFE membrane by heat lamination in the following manner. The porous PTFE membrane and the air-permeable supporting member are pressed, at a pressure of, for example, 10 to 40 N/m, with a heat roll that has been heated at, for example, 130 to 200° C. Thus, the porous PTFE membrane and the air-permeable supporting member are adhered to each other. The line speed of the heat lamination depends on the diameter of the heat roll and heating temperature or the heating method, but it is preferably 5.0 to 20.0 m/min, for example.

EXAMPLES

Hereinafter, the present invention is described in detail with reference to Examples, but the present invention is not restricted to these Examples.

100 parts by weight of fine PTFE powder (Polyflon F-104 produced by Daikin Industries, Ltd.) was mixed uniformly with 20 parts by weight of a liquid lubricant (n-dodecane produced by Japan Energy Corporation). The mixture was compressed in a cylinder and extruded with a ram extruder. Thus, a sheet-form body extending in the first direction was obtained. This sheet-form body containing the liquid lubricant was rolled to a thickness of 0.2 mm through a metal roll pair. Subsequently, the sheet-form body was heated at 150° C. to remove the liquid lubricant and to be dried. The sheet-form body thus obtained was stretched by a factor of 20 in the longitudinal direction at 370° C., and further stretched by a factor of 4.1 to 10.3 again in the longitudinal direction at 370° C. Then, the sheet-form body stretched in the longitudinal direction was stretched by a factor of 4 or 9 in the width direction at 150° C. Thus, a porous PTFE membrane was obtained. (Samples 1 to 8)

A porous PTFE membrane was obtained in the same manner as in Samples 1 to 8, except that the dried sheet-form body was stretched by a factor of 20 in the longitudinal direction at 375° C., further stretched by a factor of 3 or 5 again in the longitudinal direction at 375° C., and thereafter stretched by a factor of 5 in the width direction at 150° C. (Samples 9 and 10)

Comparative Example 1

A porous PTFE membrane was obtained in the same manner as in Samples 1 to 8, except that after the sheet-form body was stretched by a factor of 3 in the longitudinal direction at 375° C., it was stretched by a factor of 10 in the width direction at 150° C.

Comparative Example 2

With reference to JP 08 (1996)-32791 B, a porous PTFE membrane of Comparative Example 2 was produced by carrying out stretchings at temperatures equal to or lower than the melting point of PTFE. Specifically, 100 parts by weight of fine PTFE powder (Fluon CD-1 produced by Asahi Glass Co., Ltd.) was mixed uniformly with 20 parts by weight of a liquid lubricant (n-dodecane produced by Japan Energy Corporation). The mixture was compressed in a cylinder and extruded with a ram extruder. Thus, a sheet-form body extending in the first direction was obtained. This sheet-form body containing the liquid lubricant was rolled to a thickness of 0.2 mm through a metal roll pair. Subsequently, the sheet-form body containing the liquid lubricant was stretched preliminarily by a factor of 4 in the width direction. Thereafter, the sheet-form body was heated at 150° C. to remove the liquid lubricant and to be dried. The sheet-form body thus obtained was stretched by a factor of 20 in the longitudinal direction at 280° C., and further stretched by a factor of 10 in the width direction at 150° C. Subsequently, the sheet-form body, which has been stretched in both the longitudinal and width directions, was heated at 360° C. while being restrained to prevent shrinkage, so as to carry out heat setting. Thus, a porous PTFE membrane was obtained.

(Test)

The Frazier numbers (air permeabilities) of the porous PTFE membranes of Examples and Comparative Examples 1 and 2 were measured. The measurements were carried out at arbitrary 5 points, and the average thereof was calculated. As a Frazier tester in JIS L1096, a TEXTEST air permeability tester (FX 3300) was used for the measurements.

The longitudinal lengths of fibrils were measured with a caliper based on the photomicrographs (see FIGS. 1 to 7) of the porous PTFE membranes of Examples and Comparative Examples 1 and 2 taken at a magnification of 150. The lengths of 10 arbitrarily selected fibrils were measured, and the average thereof was calculated. It should be noted that, among the porous PTFE membranes of Examples, the measurements of fibrils were carried out on Samples 1, 2, 4, 5, 7, 9 and 10 only (photomicrographs of Samples 9 and 10 are not shown).

Table 1 shows the results of these tests as well as the stretching factors and stretching temperatures for the production of the porous PTFE membranes of Examples and Comparative Examples.

Example 1, for example, the longitudinal stretching factor is 3 and the length of fibrils is 10 µm. In contrast, in Examples, the longitudinal stretching factors are 40 or more and the lengths of fibrils are all longer than 100 µm.

Figure 8A:
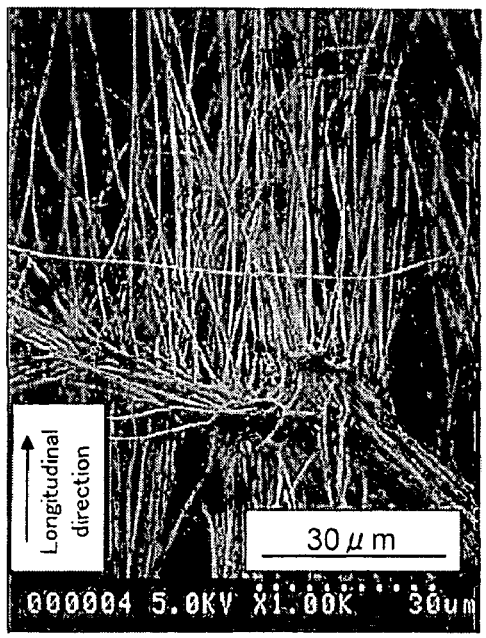
FIG. 8A is an enlarged view (at a magnification of 1000) of the PTFE membrane of FIG. 2.
Figure 8B:
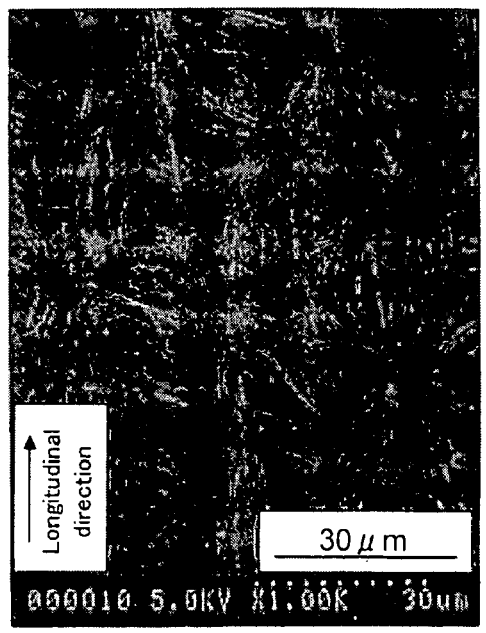
FIG. 8B is an enlarged view (at a magnification of 1000) of the PTFE membrane of FIG. 7.

Furthermore, the porous PTFE membrane of Comparative Example 2 has almost the same air permeability as that of the porous PTFE membrane of Sample 2, but the porous PTFE membrane of Comparative Example 2 is completely different from that of Sample 2 in the membrane structure, as shown in FIGS. 8A and 8B, which clearly shows an advantageous effect of the production method of the present invention.

Next, the porous PTFE membranes of Samples 9 and 10 and Comparative Examples 1 and 2 were subjected to an oil repellent treatment, and then the air permeabilities thereof were measured in the same manner as described above. The oil repellent treatment was performed in the following manner. First, an oil repellent agent X-70-029B produced by Shinetsu Chemical Co., Ltd. was diluted to 0.5% by weight with a diluent (FS thinner produced by Shinetsu Chemical Co., Ltd.), and thus an oil repellent treatment solution was obtained. The porous PTFE membrane was set in a 20 cm square frame to prevent shrinkage and dipped in the oil repellent treatment solution for about 3 seconds while maintaining the solution at 20° C. Then, the membrane was left standing for about 1 hour at room temperature to be dried. Table 2 shows the air permeabilities before and after the oil repellent treatment.

TABLE 2

| | Air permeability (cm³/cm²/s) | |
| --- | --- | --- |
| | Before oil repellent treatment | After oil repellent treatment |
| Sample 9 | 30.2 | 11.1 |
| Sample 10 | 70.9 | 28.0 |
| Comparative Example 1 | 0.4 | 0.2 |
| Comparative Example 2 | 52.4 | 0.8 |

As shown in Table 2, the air permeability of Comparative Example 2 was reduced by about 98.5% after the oil repellent

TABLE 1

| | | Stretching in longitudinal direction | | Stretching in width direction | | Air permeability (cm³/cm²/s) | Length of fibrils (µm) |
| --- | --- | --- | --- | --- | --- | --- | --- |
| | | Stretching factor | Temperature (° C.) | Stretching factor | Temperature (° C.) | | |
| Examples | Sample 1 | 82 | 370 | 9 | 150 | 39.8 | 155 |
| | Sample 2 | 102 | | 9 | | 55.5 | 187 |
| | Sample 3 | 124 | | 4 | | 53.1 | — |
| | Sample 4 | 124 | | 9 | | 79.5 | 244 |
| | Sample 5 | 146 | | 9 | | 90.2 | 188 |
| | Sample 6 | 158 | | 9 | | 108.8 | — |
| | Sample 7 | 196 | | 9 | | 129.4 | 245 |
| | Sample 8 | 206 | | 9 | | 143.2 | — |
| | Sample 9 | 60 | 375 | 5 | 150 | 30.2 | 122 |
| | Sample 10 | 100 | | 5 | | 70.9 | 143 |
| Comparative Example 1 | | 3 | 375 | 10 | 150 | 0.4 | 10 |
| Comparative Example 2 | | 20 | 280 | 10 | 150 | 52.4 | 44 |

As shown in Table 1, as the longitudinal stretching factor increases, the length of fibrils also increases, and the air permeability is enhanced accordingly. In Comparative treatment. In contrast, in Samples 9 and 10, the air permeabilities were reduced by only about 60% even after the oil repellent treatment.

The present invention is useful as a method for obtaining a porous PTFE membrane that is attached to an air-permeable supporting member to constitute a filter medium.

The invention may be embodied in other forms without departing from the spirit or essential characteristics thereof. The embodiments disclosed in this specification are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method of producing a porous polytetrafluoroethylene membrane, the method comprising:
    forming a mixture of a polytetrafluoroethylene fine powder and a liquid lubricant into a sheet-form body extending in a first direction;
    removing the liquid lubricant from the sheet-form body;
    stretching the sheet-form body by a factor of 40 to 250 in the first direction at a temperature equal to or higher than a melting point of polytetrafluoroethylene; and
    further stretching the stretched sheet-form body by a factor of 3 to 40 in a width direction orthogonal to the first direction.

2. The method of producing a porous polytetrafluoroethylene membrane according to claim 1, further comprising subjecting a porous polytetrafluoroethylene membrane obtained by stretching the sheet-form body in both the first direction and the width direction to an oil repellent treatment.

3. A porous polytetrafluoroethylene membrane obtained by a method of producing a porous polytetrafluoroethylene membrane comprising:
    forming a mixture of a polytetrafluoroethylene fine powder and a liquid lubricant into a sheet-form body extending in a first direction;
    removing the liquid lubricant from the sheet-form body;
    stretching the sheet-form body by a factor of 40 to 250 in the first direction at a temperature equal to or higher than a melting point of polytetrafluoroethylene;
    and further stretching the stretched sheet-form body by a factor of 3 to 40 in a width direction orthogonal to the first direction;
    wherein the porous polytetrafluoroethylene membrane has an air permeability corresponding to a Frazier number of 30 to 200 $cm^3/cm^2/s$.

4. The porous polytetrafluoroethylene membrane according to claim 3, wherein the porous polytetrafluoroethylene membrane has a structure in which fibrils extend predominantly in the first direction, and each of the fibrils has a length of at least 100 μm.

5. A filter medium comprising:
    the porous polytetrafluoroethylene membrane according to claim 3; and
    an air-permeable supporting member attached to the porous polytetrafluoroethylene membrane.

6. A porous polytetrafluoroethylene membrane obtained by a method of producing a porous polytetrafluoroethylene membrane comprising:
    forming a mixture of a polytetrafluoroethylene fine powder and a liquid lubricant into a sheet-form body extending in a first direction;
    removing the liquid lubricant from the sheet-form body;
    stretching the sheet-form body by a factor of 40 to 250 in the first direction at a temperature equal to or higher than a melting point of polytetrafluoroethylene;
    further stretching the stretched sheet-form body by a factor of 3 to 40 in a width direction orthogonal to the first direction; and
    further comprising subjecting a porous polytetrafluoroethylene membrane obtained stretching the sheet-form body in both the first direction and the width direction to an oil repellent treatment;
    wherein the porous polytetrafluoroethylene membrane has an air permeability corresponding to a Frazier number of 10 to 100 $cm^3/cm^2/s$.

7. The porous polytetrafluoroethylene membrane according to claim 6, wherein the porous polytetrafluoroethylene membrane has a structure in which fibrils extend predominantly in the first direction, and each of the fibrils has a length of at least 100 μm.

8. A filter medium comprising:
    the porous polytetrafluoroethylene membrane according to claim 6; and
an air-permeable supporting member attached to the porous polytetrafluoroethylene membrane.

* * * * *

UNITED STATES PATENT AND TRADEMARK OFFICE
CERTIFICATE OF CORRECTION

| | | |
|---|---|---|
| PATENT NO. | : 8,123,839 B2 | Page 1 of 1 |
| APPLICATION NO. | : 12/424907 | |
| DATED | : February 28, 2012 | |
| INVENTOR(S) | : Abe et al. | |

It is certified that error appears in the above-identified patent and that said Letters Patent is hereby corrected as shown below:

Title Page, Item (75) in the Inventors Information: "Yuuichi Abe" should read --Yuichi Abe--.

Column 8, line 27 (Claim 6): "obtained stretching" should read --obtained by stretching--.

Signed and Sealed this
Twenty-fourth Day of July, 2012

David J. Kappos
*Director of the United States Patent and Trademark Office*